US012789888B2

(12) United States Patent
Wang et al.

(10) Patent No.: US 12,789,888 B2
(45) Date of Patent: Nov. 10, 2026

(54) VEHICLE CONTROL METHOD AND APPARATUS

(71) Applicant: Yinwang Intelligent Technologies Co., Ltd., Shenzhen (CN)

(72) Inventors: Hui Wang, Shenzhen (CN); Ping Li, Shenzhen (CN); Yunfei Dong, Shanghai (CN); Tianzhu Song, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 18/620,053

(22) Filed: Mar. 28, 2024

(65) Prior Publication Data

US 2024/0270305 A1 Aug. 15, 2024

Related U.S. Application Data

(63) Continuation of application No. PCT/CN2021/121701, filed on Sep. 29, 2021.

(51) Int. Cl.
*B62D 5/04* (2006.01)
*B62D 6/00* (2006.01)

(52) U.S. Cl.
CPC ............. *B62D 5/0466* (2013.01); *B62D 6/00* (2013.01)

(58) Field of Classification Search
CPC .......... B62D 5/0466; B62D 6/00; B62D 1/00; B62D 15/027; B62D 6/002
USPC ............................................................ 701/41
See application file for complete search history.

(56) References Cited

U.S. PATENT DOCUMENTS

2013/0018550 A1 1/2013 Kim
2013/0103261 A1* 4/2013 Kim .................... B62D 15/027 701/41
2017/0029020 A1* 2/2017 Baehrle-Miller .. B62D 15/0245

FOREIGN PATENT DOCUMENTS

CN 102795262 A 11/2012
CN 108327782 A 7/2018
CN 106394659 B 9/2018
CN 110962925 A 4/2020
CN 113335380 A 9/2021
JP 2011091899 A * 5/2011 ............. B60L 58/40

OTHER PUBLICATIONS

JP 2011091899-A—English Translation (Year: 2009).*

* cited by examiner

*Primary Examiner* — Scott A Reinbold
(74) *Attorney, Agent, or Firm* — Conley Rose, P.C.

(57) ABSTRACT

A method for vehicle control includes: determining, based on first status information of a vehicle, that the vehicle satisfies a condition to perform a steering return, where the first status information of the vehicle includes information that an initial turning angle of a turning wheel of the vehicle is greater than a first threshold; determining, based on second status information of the vehicle, that a user has a need to park for a long time, where the second status information includes status change information of the vehicle, and the status change information of the vehicle is used to determine that the user has the need to park for a long time; and performing a steering return process in a first preset time period based on a first function.

20 Claims, 7 Drawing Sheets

VEHICLE CONTROL METHOD AND APPARATUS

CROSS-REFERENCE TO RELATED APPLICATIONS

This is a continuation of International Patent Application No. PCT/CN2021/121701 filed on Sep. 29, 2021, which is hereby incorporated by reference in its entirety.

TECHNICAL FIELD

This disclosure relates to the automobile field, and in particular, to a vehicle control method and apparatus.

BACKGROUND

When a vehicle is parked, a turning wheel may be at a large turning-angle. In this state, an aligning moment caused by gravity of a vehicle body cannot be released due to a kingpin inclination angle of the wheel and static friction between a tire and ground. As a result, chassis components of the vehicle, such as a tie rod, a steering knuckle, and a suspension walking arm, may be subject to tension and compressive stress in a non-design condition. Long-term tension and compressive stress will accelerate deformation and failure of these components, especially for rubber components, such as a shock-absorbing bushing and a sealing ring. Therefore, parking with the turning wheel at a large turning-angle may affect an overall service life of the vehicle. In addition, a safety hazard may be caused when the vehicle starts up again.

SUMMARY

This disclosure provides a vehicle control method. According to the method, when a user has a need to park for a long time, a turning wheel at a large turning-angle is controlled to automatically return to the straight direction, to improve reliability of controlling a return process of the turning wheel.

According to a first aspect, a vehicle control method is provided. The method includes determining, based on first status information of a vehicle, that the vehicle needs to perform a steering return, where the first status information includes information that an initial turning angle of a turning wheel of the vehicle is greater than a first threshold, determining, based on second status information of the vehicle, that a user has a need to park for a long time, where the second status information includes status change information of the vehicle, and performing a steering return process in a first preset time period, where the steering return process is used to change the initial turning angle of the turning wheel.

In this embodiment of this disclosure, it is determined that the vehicle satisfies a condition to perform the steering return by determining the first status information of the vehicle. In addition, it can be determined, based on the second status information of the vehicle, that the user has a need to park for a long time, and the second status information includes the status change information of the vehicle. Reliability of controlling a steering return process of the turning wheel can be improved by determining that the user has the need to park for a long time.

With reference to the first aspect, in some implementations of the first aspect, the status change information of the vehicle includes change information of a key switch, a one-button start switch, and at least one of an alternating current charging state, a direct current charging state, or a wireless charging state of the vehicle.

With reference to the first aspect, in some implementations of the first aspect, if it is determined that the key switch is switched from an on position to an off position, the one-button start switch is switched from an on state to an off state, and the vehicle is in the at least one of the alternating current charging state, the direct current charging state, or the wireless charging state, it is determined that the user has the need to park for a long time.

With reference to the first aspect, in some implementations of the first aspect, third status information of the vehicle is determined. The third status information indicates that the vehicle is currently capable of steering assistance. The third status information includes at least one of working status information of a steering system, working status information of a direct current-direct current converter, and working status information of a main power source of the vehicle.

With reference to the first aspect, in some implementations of the first aspect, the steering return process is performed based on a first function in the first preset time period. The first function represents a kinematic characteristic of the turning wheel, and first-order differentials of the first function at a start point and an end point of the first preset time period are 0 or approach 0.

In this embodiment of this disclosure, overload of a steering assistance motor caused by turning wheel lock in the steering return process can be avoided by performing the steering return process in the first preset time period. In addition, stability of the steering return can be ensured by performing the steering return process based on the first function, with the first-order differentials of the first function at the start point and the end point of the first preset time period being 0 or approaching 0, so as to reduce control difficulty and improve control precision.

With reference to the first aspect, in some implementations of the first aspect, the first function is represented by the following formula:

$$\theta(t) = \theta_{max}\left[\frac{t}{T} - \frac{1}{2\pi}\sin(2\pi t/T)\right]$$

$\theta_{max}$ represents the initial turning angle of the turning wheel, T represents duration of the first preset time period, and $\theta(t)$ represents a current angle that the turning wheel has returned. A difference between the initial turning angle of the turning wheel and the current angle that the turning wheel has returned is a current turning angle of the turning wheel.

With reference to the first aspect, in some implementations of the first aspect, a vehicle controller is requested to cut off the main power source of the vehicle after a second preset time period, where duration of the second preset time period is greater than or equal to the duration of the first preset time period.

The vehicle controller may include a vehicle control unit (VCU) or a controller of main power source (for example, a battery controller or an engine control unit). The main power source of the vehicle may be a vehicle power source providing energy for a system in the vehicle.

In this embodiment of this disclosure, it can be ensured that electric energy of a subsequent self-return process of the turning wheel comes from the main power source by requesting a delayed cutting off of the main power source of the vehicle, so as to avoid a low state of battery caused by performing the steering return.

With reference to the first aspect, in some implementations of the first aspect, the main power source of the vehicle includes a drive apparatus and an energy source of the vehicle.

The drive apparatus can be configured to convert the energy source into mechanical energy. For example, the drive apparatus may be an internal combustion engine, an electric motor, an air compression engine, or a combination of other types of engines, for example, a hybrid engine including a gasoline engine and an electric motor, or a hybrid engine including an internal combustion engine and an air compression engine. The energy source may include gasoline, diesel, other oil-based fuels, propane, other compressed gas-based fuels, ethanol, a solar panel, a battery, and other power sources.

With reference to the first aspect, in some implementations of the first aspect, when it is determined that the first preset time period ends, the steering return process is stopped, or when it is determined that the initial turning angle of the turning wheel of the vehicle is less than a second threshold, the steering return process is stopped.

With reference to the first aspect, in some implementations of the first aspect, first information is sent to a user interface of the vehicle, where the user interface is configured to provide information for a user of the vehicle or receive information entered by a user of the vehicle, and the first information includes the information that the initial turning angle of the turning wheel is greater than the first threshold.

With reference to the first aspect, in some implementations of the first aspect, second information entered through the user interface is received after the first information is sent to the user interface of the vehicle. The steering return process is performed if the second information includes information about performing the steering return process, or the steering return process is exited if the second information includes information about not performing the steering return process.

With reference to the first aspect, in some implementations of the first aspect, a first timer is enabled after the first information is sent to the user interface of the vehicle, and the steering return process is exited if the information entered through the user interface is not received after the first timer expires.

According to a second aspect, a vehicle control apparatus is provided. The apparatus includes a processing unit, where the processing unit is configured to determine, based on first status information of a vehicle, that the vehicle needs to perform the steering return, where the first status information includes information that an initial turning angle of a turning wheel of the vehicle is greater than a first threshold. The processing unit is further configured to determine, based on second status information of the vehicle, that a user has a need to park for a long time, where the second status information includes status change information of the vehicle. The processing unit is further configured to perform a steering return process in a first preset time period, where the steering return process is used to change the initial turning angle of the turning wheel.

With reference to the second aspect, in some implementations of the second aspect, the status change information of the vehicle includes change information of a key switch, a one-button start switch, and at least one of an alternating current charging state, a direct current charging state, or a wireless charging state of the vehicle.

With reference to the second aspect, in some implementations of the second aspect, the processing unit is further configured to, if it is determined that the key switch is switched from an on position to an off position, the one-button start switch is switched from an on state to an off state, and the vehicle is in the at least one of the alternating current charging state, the direct current charging state, or the wireless charging state, determine that the user has the need to park for a long time.

With reference to the second aspect, in some implementations of the second aspect, the processing unit is further configured to determine third status information of the vehicle, where the third status information indicates that the vehicle is currently capable of steering assistance. The third status information includes at least one of working status information of a steering system, working status information of a direct current-direct current converter, and working status information of a main power source of the vehicle.

With reference to the second aspect, in some implementations of the second aspect, the processing unit is further configured to perform the steering return process based on a first function in the first preset time period. The first function represents a kinematic characteristic of the turning wheel, and first-order differentials of the first function at a start point and an end point of the first preset time period are 0 or approach 0.

With reference to the second aspect, in some implementations of the second aspect, the first function is represented by the following formula:

$$\theta(t) = \theta_{max}\left[\frac{t}{T} - \frac{1}{2\pi}\sin(2\pi t/T)\right]$$

$\theta_{max}$ represents the initial turning angle of the turning wheel, T represents duration of the first preset time period, and θ(t) represents a current angle that the turning wheel has returned. A difference between the initial turning angle of the turning wheel and the current angle that the turning wheel has returned is a current turning angle of the turning wheel.

With reference to the second aspect, in some implementations of the second aspect, the processing unit is further configured to request a vehicle controller to cut off the main power source of the vehicle after a second preset time period, where duration of the second preset time period is greater than or equal to the duration of the first preset time period.

With reference to the second aspect, in some implementations of the second aspect, the main power source of the vehicle includes a drive apparatus and an energy source of the vehicle.

With reference to the second aspect, in some implementations of the second aspect, the processing unit is further configured to stop performing the steering return process when it is determined that the first preset time period ends, or stop performing the steering return process when it is determined that the initial turning angle of the turning wheel of the vehicle is less than a second threshold.

With reference to the second aspect, in some implementations of the second aspect, the apparatus further includes a transceiver unit configured to send first information to a user interface of the vehicle, where the user interface is configured to provide information for a user of the vehicle or receive information entered by a user of the vehicle, and the first information includes the information that the initial turning angle of the turning wheel is greater than the first threshold.

With reference to the second aspect, in some implementations of the second aspect, the transceiver unit is further configured to receive second information entered through the user interface. The processing unit is further configured to perform the steering return process if the second information includes information about performing the steering return process, or the processing unit is further configured to exit the steering return process if the second information includes information about not performing the steering return process.

With reference to the second aspect, in some implementations of the second aspect, the processing unit is further configured to enable a first timer, and exit the steering return process if the information entered through the user interface is not received after timing of the first timer expires.

According to a third aspect, a steering system is provided, including a memory and a processor. The memory stores computer program instructions, and the computer program instructions are run to enable the processor to implement the method according to the first aspect and any of the possible implementations of the first aspect.

According to a fourth aspect, a vehicle is provided, including a memory and a processor. The memory stores computer program instructions, and the computer program instructions are run to enable the processor to implement the method according to the first aspect and any of the possible implementations of the first aspect.

According to a fifth aspect, a vehicle control apparatus is provided, including a memory and a processor. The memory stores computer program instructions, and the computer program instructions are run to enable the processor to implement the method according to the first aspect and any of the possible implementations of the first aspect.

According to a sixth aspect, a vehicle control apparatus is provided, including a processor and an interface circuit. The processor is coupled to a memory through the interface circuit, and the processor is configured to execute program code in the memory, so as to implement the method according to the first aspect and any of the possible implementations of the first aspect.

According to a seventh aspect, a computer-readable storage medium is provided. The computer-readable storage medium stores a computer program. When the computer program is executed by a processor, a vehicle control apparatus is enabled to implement the method according to the first aspect and any of the possible implementations of the first aspect.

According to an eighth aspect, a computer program product including instructions is provided. When the instructions are executed by a processor, a vehicle control apparatus is enabled to implement the method according to the first aspect and any of the possible implementations of the first aspect.

DESCRIPTION OF EMBODIMENTS

The following describes technical solutions of this disclosure with reference to accompanying drawings.

Terms used in the following embodiments are merely intended to describe specific embodiments, but are not intended to limit this disclosure. Terms "one", "a", "the", "the foregoing", "this", and "the one" of singular forms used in this specification and the appended claims of this disclosure are also intended to include expressions such as "one or more", unless otherwise specified in the context clearly. It should be further understood that in the following embodiments of this disclosure, "at least one" and "one or more" refer to one, two, or more.

Reference to "an embodiment", "some embodiments", or the like described in this specification indicates that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise further emphasized in another manner. The terms "include", "comprise", and "have", and variants thereof all mean "include but are not limited to", unless otherwise further emphasized in another manner.

The technical solutions in embodiments of this disclosure may be applied to a steering system of a vehicle. The steering system of the vehicle is configured to control a direction of travel or reverse of the vehicle according to a driver's intention or a control instruction. For example, common steering systems include an electric power steering (EPS) control system, an electrically powered hydraulic steering (EHPS) system, and the like.

Figure 1:
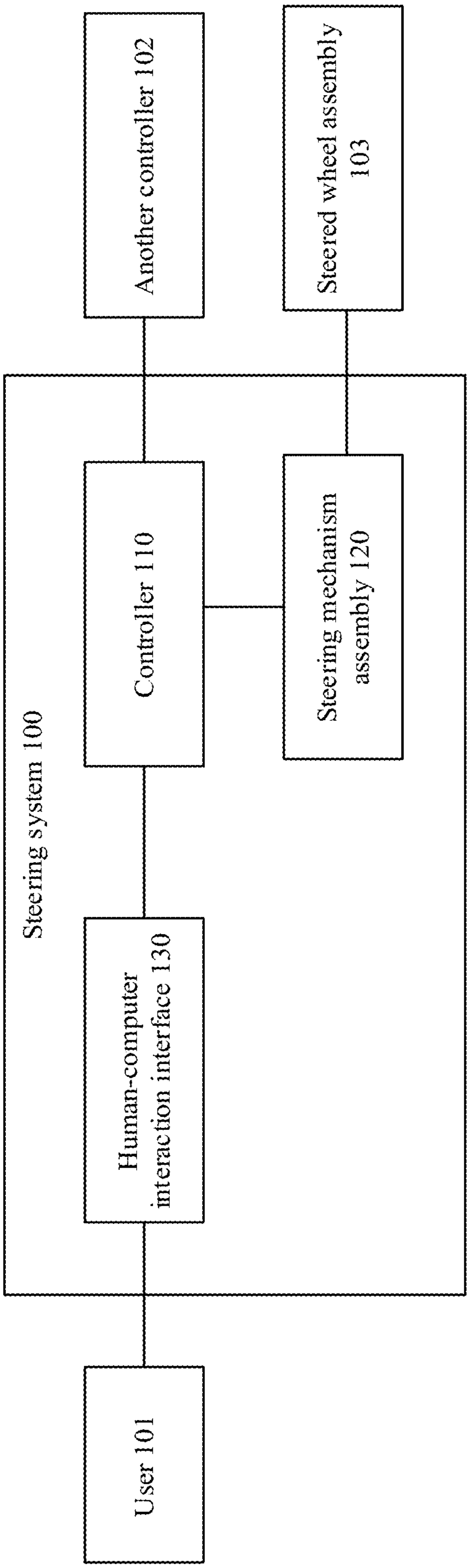
FIG. 1 is a schematic diagram of a vehicle steering system according to an embodiment of this disclosure.

FIG. 1 is a diagram of an example architecture of a steering system according to an embodiment of this disclosure. As shown in FIG. 1, the steering system 100 includes a controller 110 and a steering mechanism assembly 120. The controller 110 may be configured to output a control instruction, so as to control the steering mechanism assembly 120 to output a steering torque to a steered wheel assembly 103. The controller 110 may generate the control instruction based on a steering intention of a driver or based on information of another controller 102. For example, the controller 110 generates the control instruction based on a steering requirement entered by the driver through a steering wheel, or generates the control instruction based on requirements for a longitudinal moment and a yaw moment of a vehicle that are determined by a controller of an advanced driving assistant system (ADAS). The steering mechanism assembly 120 may include a steering execution mechanism, a turning angle displacement sensor, and a power-assisted apparatus. Optionally, the steering system 100 may further include a human-computer interaction interface (or user interface) 130, where the user interface 130 may include one or more input/output devices, such a microphone, and a speaker. Information interaction between the controller and a user 101 may be implemented through the user interface 130, so as to enable more intelligent and user-friendly steering control.

The vehicle may be a conventional vehicle, a new energy vehicle, an intelligent vehicle, or the like. The conventional vehicle is a vehicle that provides energy with gasoline, diesel, or the like. The new energy vehicle is a newly emerged vehicle that provides energy with a new energy source such as electric energy or gas. The intelligent vehicle is a vehicle mounted with an intelligent device such as an intelligent control unit. A vehicle type of the vehicle may include, for example, a car, a truck, a passenger car, an engineering vehicle, or a bus. This is not limited in this embodiment of this disclosure.

When a vehicle is parked, a turning wheel may be at a large turning-angle. In this state, an aligning moment caused by gravity of a vehicle body cannot be released, which may cause chassis components of the vehicle to be subject to tension and compressive stress in a non-design condition. Long-term tension and compressive stress will accelerate deformation and failure of these components, especially for rubber components therein. Therefore, parking with the turning wheel at a large turning-angle may affect an overall service life of the vehicle. In addition, a safety hazard may be caused when the vehicle starts up again. In view of this, this disclosure provides a vehicle control method. According to the method, when a user has a need to park for a long time, a turning wheel at a large turning-angle may be controlled to perform the steering return. The method can improve reliability of controlling a self-return process of the turning wheel.

In this embodiment of this disclosure, the turning wheel at a large turning-angle may mean that there is a large included angle between the turning wheel and a longitudinal symmetry axis of the vehicle. As shown in FIG. 2B, there is an included angle ß between the turning wheel and a longitudinal symmetry axis x of the vehicle. When the included angle ß exceeds a threshold, it may be considered that the turning wheel is at a large turning-angle. The included angle ß may be referred to as an initial turning angle of the turning wheel. The threshold may be set based on an actual situation, and this is not limited in this disclosure.

Figure 2A:
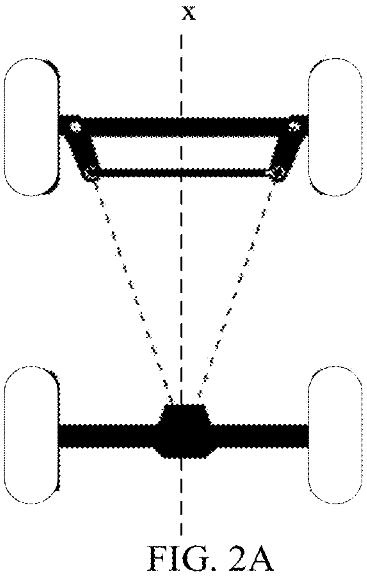
FIG. 2A and FIG. 2B are schematic diagrams of a turning angle of a turning wheel according to an embodiment of this disclosure.
Figure 2B:
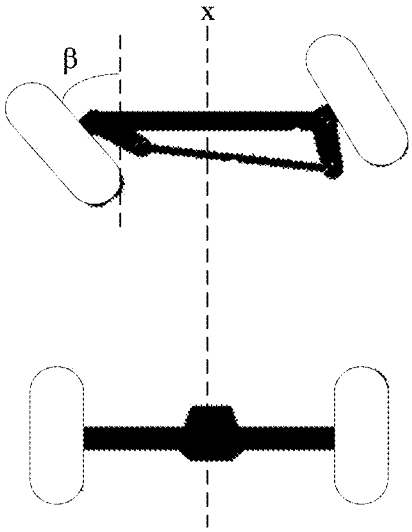

It should be understood that, in this embodiment of this disclosure, both "controlling a steering return" and "performing a steering return process" may refer to controlling the turning wheel at a large turning-angle to return to a state (an aligned state) with no included angle or a small included angle between the turning wheel and the longitudinal symmetry axis of the vehicle, as shown in FIG. 2A. A steering self-return may refer to a process in which a controller determines that the vehicle satisfies a condition of the steering return and controls the turning wheel to return. The process may be performed by the controller instead of a human.

Figure 3:
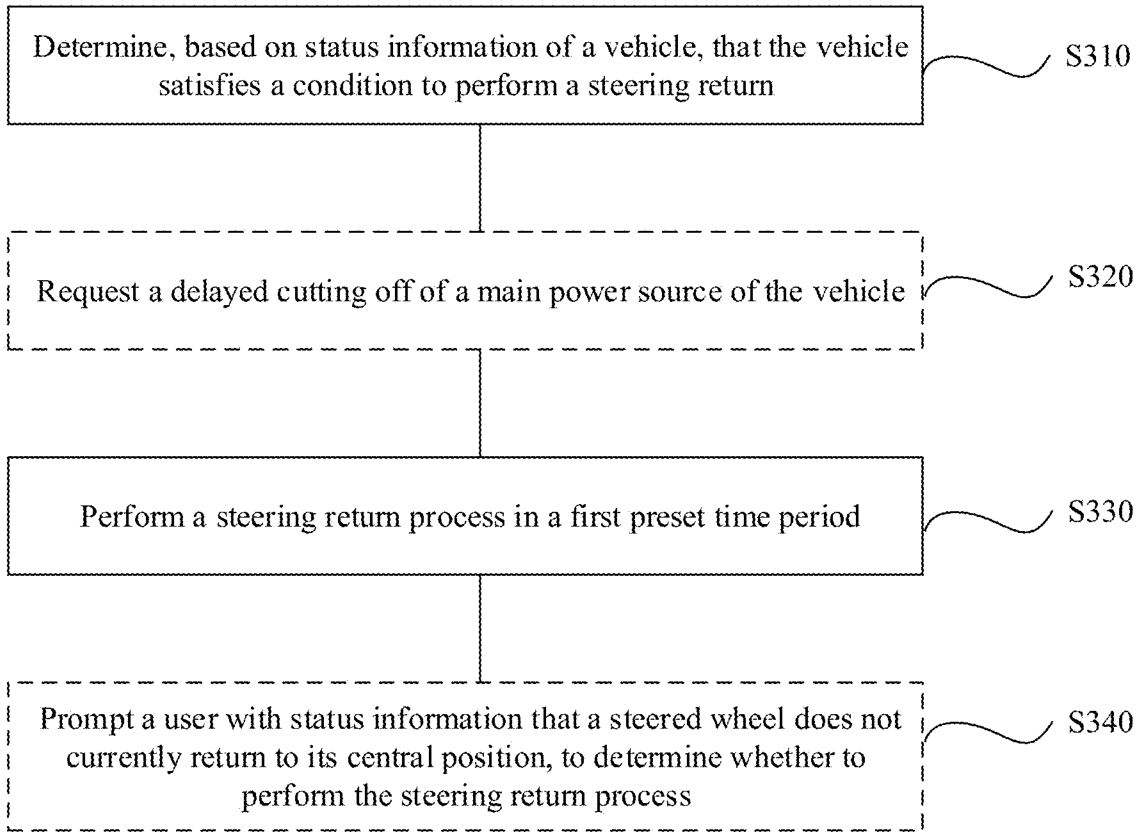
FIG. 3 is a flowchart of a vehicle control method according to an embodiment of this disclosure.

With reference to FIG. 3, the following describes in detail a vehicle control method according to an embodiment of this disclosure. The method may be performed by a controller. The controller may be a controller 110 in the foregoing steering system, or may be a chip, a circuit, a component, a system, or a mobile terminal disposed in a vehicle, or may be another device in the Internet of vehicles, such as a road side unit (RSU) or an application server. This is not limited in this disclosure.

The method includes at least the following several steps.

Step S310: Determine, based on status information of the vehicle, that the vehicle satisfies a condition to perform the steering return.

The status information of the vehicle includes first status information, and the first status information includes information that an initial turning angle of a turning wheel is greater than a first threshold. The first threshold is a preset wheel turning angle threshold. The initial turning angle of the turning wheel being greater than the first threshold may be understood as the turning wheel is at a large turning-angle. The first threshold may be set based on an actual situation. For example, the first threshold may be set to 15 degrees (°).

For example, the controller may obtain the initial turning angle of the turning wheel through a sensor installed on the turning wheel, and determine that the initial turning angle is greater than the first threshold. Alternatively, the controller may indirectly obtain the initial turning angle of the turning wheel through conversion of sensing data of an angular displacement sensor or a linear displacement sensor in the steering system.

The status information of the vehicle may further include second status information, and the second status information includes status change information of the vehicle. The controller may determine, through the status change information of the vehicle, whether a user has a need to park for a long time. In other words, the controller determines, based on the status change information, that the vehicle is currently in a state that involves long time parking. For example, the status change information may include change information of a key switch, a one-button start switch, or at least one of an alternating current charging state, a direct current charging state, or a wireless charging state of the vehicle.

For example, for a vehicle equipped with a key switch, it can be determined that the vehicle is currently in the state that involves long time parking when the controller determines that the key switch is switched from an on position to an off position. For a vehicle equipped with a one-button start switch, it can be determined that the vehicle is currently in the state that involves long time parking when the controller determines that a user presses the one-button start switch to switch the vehicle from a driving state to a fire-off or power-off state. For an electric vehicle, it can be determined that the vehicle is currently in the state that involves long time parking when the controller determines that a driver performs an alternating current charging on the vehicle. Optionally, in this scenario, it can be determined that the vehicle is currently in the state that involves long time parking by determining that a remaining charging time of the vehicle is greater than a threshold. In application scenarios of the foregoing different vehicle types, whether the user has the need to park for a long time can be further determined with reference to a gear state, a handbrake state or a state of an electronic parking brake, a driving speed state, and the like of the vehicle. It should be understood that, the status change information of the vehicle in this disclosure includes but is not limited to the foregoing status change information. Status change information of the vehicle that can be used to determine that a user has a need to park for a long time falls within scope of this disclosure.

Vehicle mis-steering caused by misjudging the driver's parking intention can be avoided by determining that the vehicle is currently in the state that involves long time parking. This reduces safety risks.

Optionally, the status information of the vehicle may further include third status information, and the third status information can indicate that the vehicle is currently capable of steering assistance. For example, the third status information may include working status information of the steering system, a direct current-direct current (DC/DC) converter, and a main power source, such as whether the steering system, the DC/DC converter, and the main power source are normal or faulty. That the controller determines, based on the third status information, that the vehicle satisfies the condition to perform the steering return may be understood as the controller determines, based on the third status information, that the vehicle is currently capable of steering assistance.

It should be understood that the controller may perform the steering return process if the controller determines, based on the foregoing status information of the vehicle, that the vehicle satisfies the condition to perform the steering return. In a possible implementation, the controller may first determine that the vehicle is currently in the state that involves long time parking, then determine, based on the third status information, that the vehicle is currently capable of steering assistance, determine that the initial turning angle of the turning wheel is greater than the first threshold, and finally perform the steering return process. A time sequence in which the controller determines different status information of the vehicle is not limited in this disclosure.

Optionally, if the controller determines, based on the foregoing status information of the vehicle, that the vehicle does not satisfy the condition to perform the steering return, the controller may determine to exit the steering return process.

Optionally, before the controller performs the steering return process, the method may further include step S320: requesting a delayed cutting off of the main power source of the vehicle.

Generally, the vehicle controller may control to cut off the main power source of the vehicle when it is determined that some status information of the vehicle changes, for example, a key switch switches from an on position to an off position, or a one-button start switch is switched from an on state to an off state.

The vehicle controller may include a VCU or a controller of main power source (for example, a battery controller or an engine control unit). The main power source of the vehicle may be a vehicle power source providing energy for a system in the vehicle. The main power source of the vehicle may include a drive apparatus and an energy source of the vehicle, and the drive apparatus can be configured to convert the energy source into mechanical energy. For example, the drive apparatus may be an internal combustion engine, an electric motor, an air compression engine, or a combination of other types of engines, for example, a hybrid engine including a gasoline engine and an electric motor, or a hybrid engine including an internal combustion engine and an air compression engine. The energy source may include gasoline, diesel, other oil-based fuels, propane, other compressed gas-based fuels, ethanol, a solar panel, a battery, and other power sources.

The controller may request the vehicle controller to delay cutting off the vehicle power source before performing the steering return process. A delay time (a second preset time period) may be set to be greater than or equal to a preset time for performing the steering return process.

In this embodiment of this disclosure, it can be ensured that electric energy of a subsequent self-return process of the turning wheel comes from the main power source by requesting the delayed cutting off of the main power source of the vehicle, so as to avoid a low state of battery caused by performing the steering self-return.

Step S330: Perform the steering return process in a first preset time period.

Further, after determining that the vehicle satisfies the condition to perform the steering return, the controller may control a steering execution mechanism to drive the turning wheel to perform the steering return process based on the first function in the first preset time period, until a condition for terminating the performed steering return process is met.

The first preset time period is a longest time that the self-return lasts. To be specific, the self-return of the turning wheel is completed within the first preset time period. When the first preset time period expires, the controller determines to exit the self-return process.

Optionally, the controller may set duration of the first preset time period based on a size of the initial turning angle of the turning wheel. For example, a mapping relationship between the turning angle of the turning wheel and the duration of the first preset time period are configured in the controller, so that the controller determines the duration of the first preset time period based on the mapping relationship.

The termination condition may include at least one of the following conditions.

Duration of performing the steering return exceeds the duration of the first preset time period, or a current turning angle of the turning wheel is less than a second threshold.

The second threshold may represent an error value of a turning wheel return. To be specific, the turning wheel may be considered to reach the aligned state when the turning wheel returns and forms any angle within the second threshold. For example, the second threshold may be 3 degrees. The second threshold may be set based on an actual situation. This is not limited in this disclosure.

According to the method provided in this embodiment of this disclosure, the steering return process is terminated when the duration of performing the steering return exceeds the duration of the first preset time period. This can avoid overload of a steering assistance motor caused by turning wheel being blocked in the steering return process.

The first function may represent a first kinematic characteristic of the turning wheel. In a possible implementation, the first function is represented by the following formula:

$$\theta(t) = \theta_{max}\left[\frac{t}{T} - \frac{1}{2\pi}\sin(2\pi t/T)\right] \quad (1)$$

$\theta_{max}$ represents the initial turning angle of the turning wheel, T represents the duration of the first preset time period, and θ(t) represents a currently-returned angle (in units of radians (rad)). A difference between the initial turning angle of the turning wheel and the currently-returned angle is a current turning angle of the turning wheel. It may be understood that, at a start point of the first preset time period, the initial turning angle of the turning wheel is equal to the current turning angle of the turning wheel.

That is, the first kinematic characteristic of the turning wheel includes an angle change of the turning wheel return. The angle change of the turning angle represented by the function features gradual increase, followed by a rapid increase, and then a gradual decrease. Particularly, first-order differentials of angles at t=0 and t=T are 0. In other words, angular velocities at a start point and an end point of the turning wheel return process represented by the first function are 0. Stability of the steering return can be ensured when the controller performs the steering return process based on the first function, so as to reduce control difficulty and improve control precision.

It should be noted that the first function may further include another function form, such as a combination of another polynomial and another trigonometric function, and a first-order differential of the first function is 0 or approaches 0. A specific form of the first function is not limited in this disclosure. Second, the kinematic characteristic may be converted into a kinematic characteristic of any component of a transmission and assistance mechanism in the steering system based on a mechanical kinematics relationship between the turning wheel and another component in a steering transmission mechanism. Therefore, using a similar function to describe a kinematic characteristic of any component in the steering system falls within the scope of this disclosure.

Optionally, the first kinematic characteristic of the turning wheel may further include an angular velocity change of the turning wheel return, as shown in formula (2):

$$\omega(t) = \frac{\theta_{max}}{T}\left[1 - \cos(2\pi t/T)\right] \tag{2}$$

$\theta_{max}$ represents the initial turning angle of the turning wheel, T represents first preset duration, and ω(t) represents an angular velocity of a current return (in units of radians per second (rad/s)).

Optionally, the first kinematic characteristic of the turning wheel may further include an angular acceleration change of the turning wheel return, as shown in formula (3):

$$a(t) = \frac{2\pi\theta_{max}}{T^2}\sin(2\pi t/T) \tag{3}$$

$\theta_{max}$ represents the initial turning angle of the turning wheel, T represents first preset duration, and ω(t) represents an angular acceleration of the current return (in units of radians per square second (rad/$s^2$)).

Figure 4:
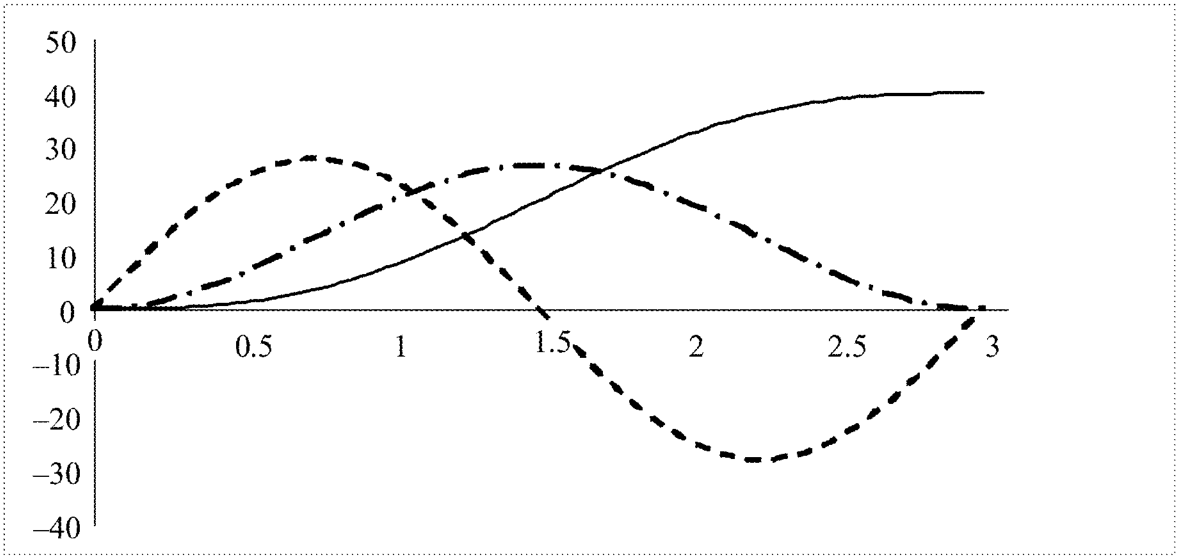
FIG. 4 is a diagram of a curve of a first function according to an embodiment of this disclosure.

Taking an initial turning angle of 40 degrees of the turning wheel and first preset duration of 3 seconds as an example, a curve of a function using an angle, an angular velocity, and an angular acceleration to represent the first kinematic characteristic of the turning wheel is shown in FIG. 4.

Optionally, that the controller performs the self-return process based on the first function in the first preset time period further includes the controller determines the current turning angle of the turning wheel at an interval of the first time interval.

The first time interval may be given at a millisecond level. For example, the first time interval is 10 milliseconds (ms). The current turning angle of the turning wheel may be a difference between the initial turning angle and the current return angle. It may be understood that the current return angle of the turning wheel is determined by the controller based on the first function.

The controller continues to perform the steering return process, and re-determines the turning angle of the turning wheel after a next first time interval ends if the controller determines that the current turning angle of the turning wheel is greater than the second threshold, that is, the turning wheel currently does not reach the aligned state. The controller determines to stop performing the steering return process if the controller determines that the current turning angle of the turning wheel is less than the second threshold, so as to enable a closed-loop control of the steering return process.

Optionally, before the controller performs the steering return process, the method may further include step S340: prompting the user with information that the turning wheel does not currently return to its central position, so as to determine whether to perform the steering return process.

Further, the controller may determine, based on a value of a state flag, whether to prompt the user with the information that the turning wheel does not currently return to its central position. For example, the value of the state flag may be "0" or "1". When the value of the state flag is "1", the controller determines to prompt the user with the status information that the turning wheel does not currently return to its central position. On the contrary, when the value of the state flag is "0", the controller determines not to prompt the user with the status information that the turning wheel does not currently return to its central position. The value of the state flag may be preconfigured, or may be determined by input of upper-layer application software. This is not limited in this disclosure.

For example, the controller may prompt, through a user interface in the vehicle, the user with the status information that the turning wheel does not currently return to its central position. The controller may send first information to the user interface, where the first information includes information that the turning wheel does not return to its central position, and the first information may further include information asking the user whether to perform turning wheel alignment. The controller may further receive second information from the user interface, where the second information may include information entered by the user on whether to perform the turning wheel alignment. If the second information includes information entered by the user on determining to perform the steering return, the controller starts to perform the steering return process, if the second information includes information about not performing the steering return, the controller determines to exit the steering return process. Alternatively, the controller may start a first timer after sending the first information. If the controller does not receive the second information after the first timer expires, the controller may also control to exit the steering return process.

Figure 5:
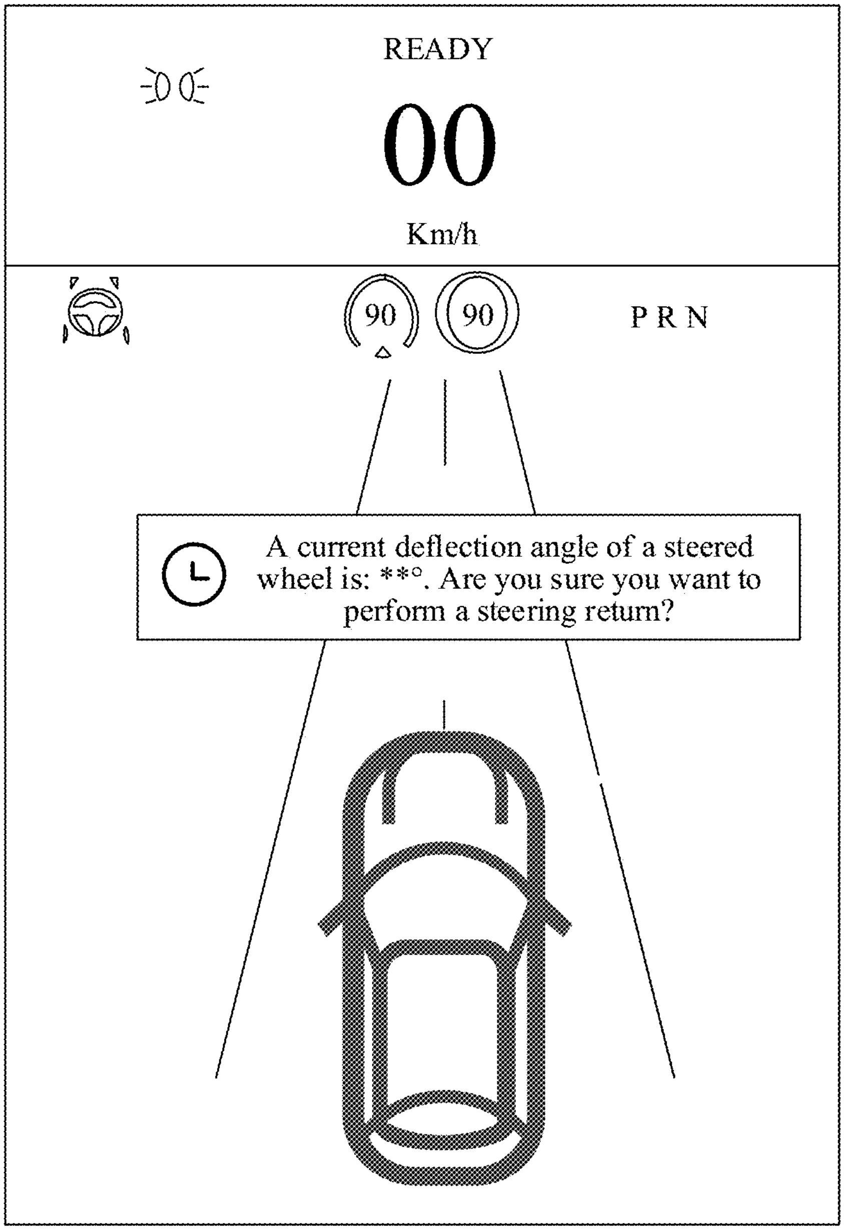
FIG. 5 is a diagram of a human-computer interaction interface according to an embodiment of this disclosure.

The user interface may be a human-computer interaction interface in the vehicle. As shown in FIG. 5, the first information may be displayed in a form of a pop-up window to prompt the user with the information that the turning wheel does not currently return to its central position. Optionally, the controller may further communicate with another terminal device outside the vehicle, and prompt the other terminal device with the first information, as shown in FIG. 6, so that the user can remotely control whether to perform the steering return process.

In this embodiment of this disclosure, a self-return process can be performed more intelligently and user-friendly and the driver's intention to park can be prevented from being misjudged, by prompting, through the user interface, the information that the turning wheel does not currently return to its central position and by determining whether to perform the self-return process by receiving indication information of the user.

Figure 6:
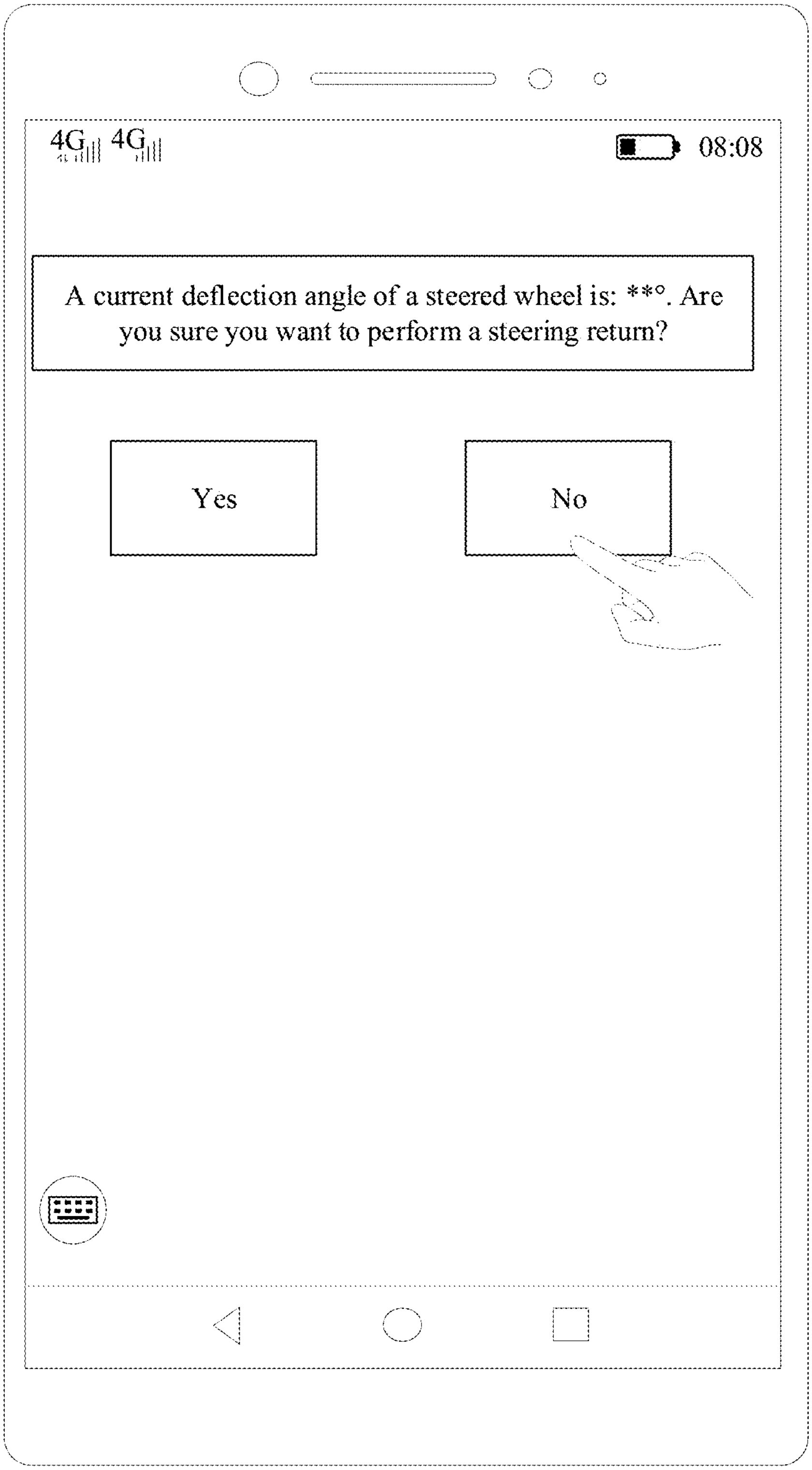
FIG. 6 is a diagram of another human-computer interaction interface according to an embodiment of this disclosure.
Figure 7:
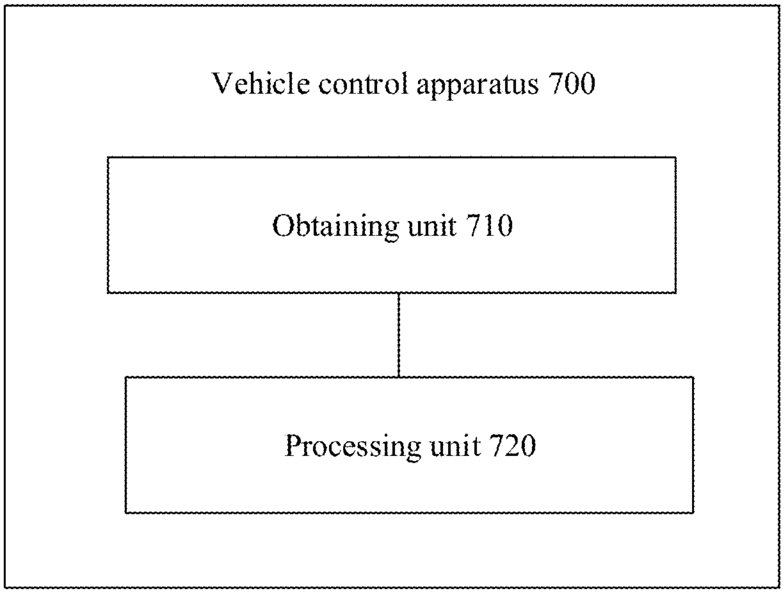
FIG. 7 is a structural block diagram of a vehicle control apparatus according to an embodiment of this disclosure.
Figure 8:
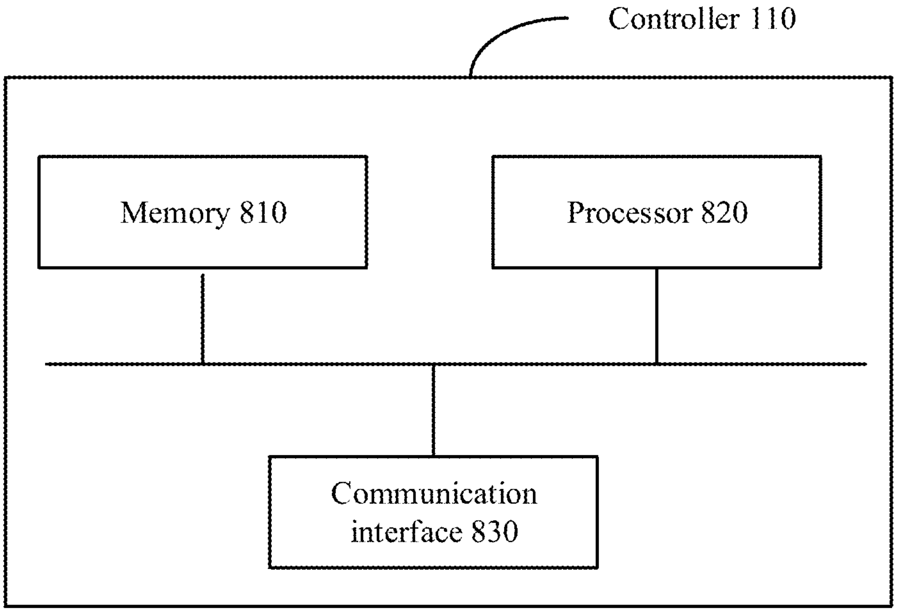
FIG. 8 is a structural block diagram of a controller according to an embodiment of this disclosure.
Figure 9:
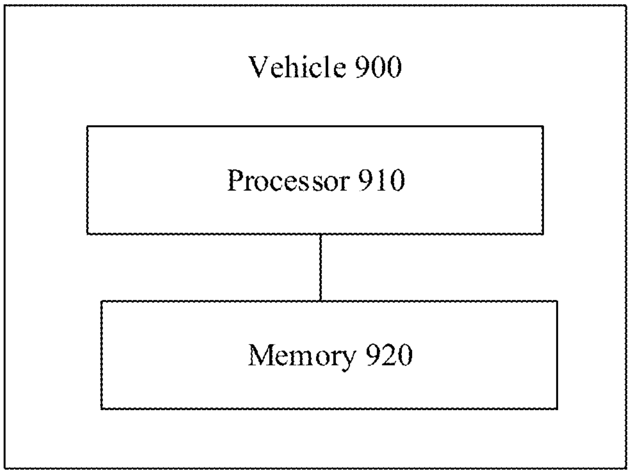
FIG. 9 is a structural block diagram of a vehicle according to an embodiment of this disclosure.

With reference to FIG. 2 and FIG. 6, the foregoing describes in detail the vehicle control method provided in embodiments of this disclosure. With reference to FIG. 7 to FIG. 9, the following describes in detail a vehicle control apparatus provided in this embodiment of this disclosure.

FIG. 7 is a structural block diagram of a vehicle control apparatus 700 according to this disclosure. As shown in FIG. 7, the apparatus 700 includes an obtaining unit 710 and a processing unit 720.

The obtaining unit 710 is configured to obtain status information of a vehicle.

The status information of the vehicle may include an initial turning angle of a turning wheel, first status information of the vehicle, and status change information of the vehicle.

The processing unit 720 is configured to determine, based on the status information of the vehicle, whether the vehicle satisfies a condition to perform the steering return.

The processing unit 720 may be further configured to request a delayed cutting off of a main power source of the vehicle, and perform a steering return process in a first preset time period.

The processing unit 720 is further configured to perform a self-return process in a first time period based on a first kinematic characteristic of the turning wheel, where the first kinematic characteristic may include a change of an angle, an angular velocity, or an angular acceleration of a turning wheel return.

For example, the obtaining unit 710 includes a sending unit or a receiving unit.

The sending unit is configured to prompt a user with status information that the turning wheel does not currently return to its central position, so as to determine whether to perform the steering return process. The receiving unit is configured to receive information entered by the user that is used to determine whether to perform turning wheel alignment.

The apparatus 700 is corresponding to an entity for executing the foregoing method embodiment. The apparatus 700 may be the vehicle in the method embodiment, or a chip, a circuit, a component, a system, or a functional module in the vehicle in the method embodiment, or may be another device (for example, an RSU or an application server) in the Internet of Vehicles. Corresponding units of the apparatus 700 are configured to perform corresponding steps in the method embodiment shown in FIG. 3.

Only one or more of the units in the apparatus 700 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field-programmable gate array (FPGA), or an application-specific integrated circuit (ASIC). The foregoing units may exist independently, or may be all or partially integrated.

FIG. 8 is a schematic block diagram of a controller 110 according to an embodiment of this disclosure. The controller shown in FIG. 8 may include a memory 810, a processor 820, and a communication interface 830. The memory 810, the processor 820, and the communication interface 830 are connected through an internal connection path. The memory 810 is configured to store instructions. The processor 820 is configured to execute the instructions stored in the memory 810 so as to control the communication interface 830 to receive/send information. Optionally, the memory 810 may be coupled to the processor 820 through an interface, or may be integrated with the processor 820.

It should be noted that the communication interface 830 uses an apparatus such as but not limited to an input/output interface to implement communication between the controller and another device or a communication network.

In an implementation process, steps in the foregoing method may be implemented by using a hardware integrated logic circuit in the processor 820, or by using instructions in a form of software. The method provided with reference to this embodiment of this disclosure may be directly performed by the hardware processor, or may be performed by a combination of hardware and software modules in the processor. A software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory 810, and the processor 820 reads information in the memory 810 and completes the steps of the foregoing method in combination with hardware of the processor 820. To avoid repetition, details are not described herein again.

FIG. 9 is a schematic diagram of a structure a vehicle 900 applicable to an embodiment of this disclosure. For ease of description, FIG. 9 shows only main components of the vehicle. As shown in FIG. 9, the vehicle 900 includes a processor 910 and a memory 920.

The memory 920 stores computer program instructions, and the processor 910 runs the computer program instructions to perform the vehicle control method described in the method embodiment shown in FIG. 3.

This disclosure further provides a computer-readable storage medium, and the computer-readable storage medium stores instructions. When the instructions are run on a computer, the vehicle control apparatus is enabled to perform the steps in the method shown in FIG. 3.

This disclosure further provides a computer program product including instructions. When the computer program product runs on a computer, the vehicle control apparatus is enabled to perform the steps in the method shown in FIG. 3.

This disclosure further provides a chip including a processor. The processor is configured to read and run a computer program stored in a memory, so as to perform the corresponding operation and/or procedure performed by a first vehicle in the vehicle control method provided in this disclosure. Optionally, the chip further includes the memory. The memory is connected to the processor through a circuit or a wire. The processor is configured to read and execute the computer program in the memory. Optionally, the chip further includes a communication interface, and the processor is connected to the communication interface. The communication interface is configured to receive processed data and/or information. The processor obtains the data and/or the information from the communication interface, and processes the data and/or the information. The communication interface may be an input/output interface, an interface circuit, an output circuit, an input circuit, a pin, a related circuit, or the like in the chip. The processor may alternatively be embodied as a processing circuit or a logic circuit.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of embodiments of this disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the function is implemented in a form of a software functional unit and sold or used as an independent product, the function may be stored in a computer-readable storage medium. Based on such an understanding, the technical solutions in this disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:

determining, based on status information of a vehicle, the vehicle is to perform a steering return process, wherein the status information comprises first information indicating that an initial turning angle of a turning wheel of the vehicle is greater than a first threshold;

determining, based on status change information of the vehicle, a user is to park the vehicle for a time longer than a second threshold, wherein the status change information comprises a charging state of the vehicle;

performing, in response to determining the user is to park the vehicle for the time longer than the second threshold, the steering return process in a first preset time period to change the initial turning angle; and stopping performing the steering return process when the first preset time period ends or when the initial turning angle is less than a third threshold.

2. The method of claim 1, wherein the status change information further comprises change information of a key switch of the vehicle and a one-button start switch of the vehicle, and wherein the charging state comprises an alternating current charging state of the vehicle, a direct current charging state of the vehicle, or a wireless charging state of the vehicle.

3. The method of claim 2, wherein determining the user is to park the vehicle for the time longer than the second threshold comprises:

identifying that the key switch is switched from an on position to an off position, the one-button start switch is switched from an on state to an off state, and the vehicle is in the at least one of the alternating current charging state, the direct current charging state, or the wireless charging state; and determining, in response to identifying that the key switch is switched from the on position to the off position, the one-button start switch is switched from the on state to the off state, and the vehicle is in the at least one of the alternating current charging state, the direct current charging state, or the wireless charging state, that the user is to park the vehicle for the time longer than the second threshold.

4. The method of claim 1, wherein before performing the steering return process, the method further comprises determining third status information of the vehicle, and wherein the third status information indicates that the vehicle is currently capable of steering assistance and comprises first working status information of a steering system, second working status information of a direct current-direct current converter, or third working status information of a main power source of the vehicle.

5. The method of claim 1, wherein performing the steering return process comprises performing, based on a first function in the first preset time period, the steering return process, wherein the first function represents a kinematic characteristic of the turning wheel, and wherein first-order differentials of the first function at a start point of the first preset time period and an end point of the first preset time period are 0 or approach 0.

6. The method of claim 1, wherein before performing the steering return process, the method further comprises requesting a vehicle controller to cut off a main power source of the vehicle after a second preset time period, and wherein a second duration of the second preset time period is greater than or equal to a first duration of the first preset time period.

7. The method of claim 1, wherein before performing the steering return process, the method further comprises sending second information to a user interface of the vehicle, and wherein the user interface is configured to provide third information for the user or receive the third information from the user.

8. An apparatus comprising:
- a memory configured to store instructions; and
- one or more processors coupled to the memory and configured to execute the instructions to cause the apparatus to:
  - determine, based on status information of a vehicle, the vehicle is to perform a steering return process, wherein the status information comprises first information indicating that an initial turning angle of a turning wheel of the vehicle is greater than a first threshold;
  - determine, based on status change information of the vehicle, a user is to park the vehicle for a time longer than a second threshold, wherein the status change information comprises a charging state of the vehicle; and
  - perform, in response to determining the user is to park the vehicle for the time longer than the second threshold, the steering return process in a first preset time period to change the initial turning angle;
- a transceiver coupled to the one or more processors and configured to send second information before the one or more processors cause the apparatus to perform the steering return process; and
- a user interface configured to:
  - receive the second information from the transceiver; and
  - provide third information for the user or receive the third information from the user.

9. The apparatus of claim 8, wherein the status change information comprises change information of a key switch of the vehicle and a one-button start switch of the vehicle, and wherein the charging state comprises an alternating current charging state of the vehicle, a direct current charging state of the vehicle, or a wireless charging state of the vehicle.

10. The apparatus of claim 9, wherein the one or more processors are further configured to execute the instructions to cause the apparatus to further determine the user is to park the vehicle for the time longer than the second threshold by:
- identifying that the key switch is switched from an on position to an off position, the one-button start switch is switched from an on state to an off state, and the vehicle is in the at least one of the alternating current charging state, the direct current charging state, or the wireless charging state; and
- determining, in response to identifying that the key switch is switched from the on position to the off position, the one-button start switch is switched from the on state to the off state, and the vehicle is in the at least one of the alternating current charging state, the direct current charging state, or the wireless charging state, that the user is to park the vehicle for the time longer than the second threshold.

11. The apparatus of claim 8, wherein the one or more processors are further configured to execute the instructions to cause the apparatus to determine, before performing the steering return process, third status information of the vehicle, and wherein the third status information indicates that the vehicle is currently capable of steering assistance and comprises first working status information of a steering system, second working status information of a direct current-direct current converter, or third working status information of a main power source of the vehicle.

12. The apparatus of claim 8, wherein the one or more processors are further configured to execute the instructions to cause the apparatus to further perform, based on a first function in the first preset time period, the steering return process, wherein the first function represents a kinematic characteristic of the turning wheel, and wherein first-order differentials of the first function at a start point of the first preset time period and an end point of the first preset time period are 0 or approach 0.

13. The apparatus of claim 8, wherein the one or more processors are further configured to execute the instructions to cause the apparatus to request, before performing the steering return process, a vehicle controller to cut off a main power source of the vehicle after a second preset time period, and wherein a second duration of the second preset time period is greater than or equal to a first duration of the first preset time period.

14. The apparatus of claim 8, wherein a main power source of the vehicle comprises a drive apparatus and an energy source of the vehicle.

15. The apparatus of claim 8, wherein the one or more processors are further configured to execute the instructions to cause the apparatus to stop performing the steering return process when the first preset time period ends or when the initial turning angle is less than a third threshold.

16. The apparatus of claim 8, wherein the transceiver is further configured to receive fourth information through the user interface, and wherein the one or more processors are further configured to execute the instructions to cause the apparatus to:
- perform the steering return process when the fourth information comprises fifth information about performing the steering return process; and
- exit the steering return process when the fourth information comprises sixth information about not performing the steering return process.

17. A computer program product comprising computer-executable instructions that are stored on a non-transitory computer-readable medium and that, when executed by a one or more processors, cause an apparatus to:
- determine, based on status information of a vehicle, the vehicle is to perform a steering return process, wherein the status information comprises first information indicating that an initial turning angle of a turning wheel of the vehicle is greater than a first threshold, and wherein the steering return process changes the initial turning angle;
- determine, based on status change information of the vehicle, a user is to park the vehicle for a time longer than a second threshold, wherein the status change information comprises a charging state of the vehicle;
- perform, in response to determining the user is to park the vehicle for the time longer than the second threshold, the steering return process in a first preset time period; and
- stop performing the steering return process when the first preset time period ends or when the initial turning angle is less than a third threshold.

18. The computer program product of claim 17, wherein the computer-executable instructions, when executed by the one or more processors, further cause the apparatus to request, before performing the steering return process, a vehicle controller to cut off a main power source of the vehicle after a second preset time period, and wherein a second duration of the second preset time period is greater than or equal to a first duration of the first preset time period.

19. The computer program product of claim 17, wherein before performing the steering return process, the computer-executable instructions, when executed by the one or more processors, further cause the apparatus to send second information to a user interface of the vehicle, and wherein the user interface is configured to provide third information for the user or receive the third information from the user.

20. The method of claim 7, further comprising:

receiving fourth information through the user interface;

performing the steering return process when the fourth information comprises fifth information about performing the steering return process; and exiting the steering return process when the fourth information comprises sixth information about not performing the steering return process.

* * * * *